United States Patent
Brocke et al.

(10) Patent No.: US 11,856,896 B2
(45) Date of Patent: Jan. 2, 2024

(54) METHOD FOR ASSISTING A COMPACTION-APPROPRIATE DISTRIBUTION OF HARVESTED MATERIAL IN A FLAT SILO

(71) Applicant: DEERE & COMPANY, Moline, IL (US)

(72) Inventors: Stefan Brocke, Mannheim (DE); Norbert Fritz, Ilvesheim (DE)

(73) Assignee: DEERE & COMPANY, Moline, IL (US)

( * ) Notice: Subject to any disclaimer, the term of this patent is extended or adjusted under 35 U.S.C. 154(b) by 514 days.

(21) Appl. No.: 17/181,392

(22) Filed: Feb. 22, 2021

(65) Prior Publication Data
US 2021/0329844 A1    Oct. 28, 2021

(30) Foreign Application Priority Data

Apr. 17, 2020  (DE) .......................... 102020204927.0
May 14, 2020   (DE) .......................... 102020206120.3

(51) Int. Cl.
*A01F 25/18*   (2006.01)
*A01F 25/16*   (2006.01)
*A01D 43/063*  (2006.01)

(52) U.S. Cl.
CPC ........ *A01F 25/183* (2013.01); *A01D 43/0633* (2013.01); *A01F 25/166* (2013.01)

(58) Field of Classification Search
CPC ...... A01F 25/18; A01F 25/183; A01F 25/166; A01F 25/186; A01B 69/00; A01B 59/066;
(Continued)

(56) References Cited

U.S. PATENT DOCUMENTS 2,788,247 A * 4/1957 Chapman ............ A01F 25/2009
                                               414/322
10,306,821 B2 * 6/2019 Michalke ............. A01B 69/001
(Continued)

FOREIGN PATENT DOCUMENTS

DE    102007053610 A1    5/2009
DE    102017205827 A1    10/2018
(Continued)

OTHER PUBLICATIONS

European Search Report issued in European Patent Application No. 21162537.1, dated Sep. 6, 2021, 5 pages.

*Primary Examiner* — Jimmy T Nguyen (57) ABSTRACT

A method for assisting a compaction-appropriate distribution of harvested material in a flat silo includes providing a silo vehicle having a control unit, ascertaining a dry-substance density to be achieved via the control unit, determining a maximally producible compaction pressure via the control unit, ascertaining a maximally permissible layer thickness via the control unit for the implementation of a distribution-and-compaction process, determining a layer thickness currently being applied during the implementation of the distribution-and-compaction process in a location-specific manner via a GPS receiver, comparing the maximally permissible layer thickness and the layer thickness currently being applied in the location-specific manner via the control unit in order to ascertain a target layer thickness, and driving a regulating device of a distribution tool provided on the silo vehicle to assimilate the layer thickness currently being applied to the target layer thickness via the control unit in an automated manner.

20 Claims, 3 Drawing Sheets

(58) Field of Classification Search
CPC .. A01B 63/111; A01B 69/004; G05D 1/0297; G05D 1/0219; G05D 2201/0201; A01D 43/0633
See application file for complete search history.

(56) References Cited

U.S. PATENT DOCUMENTS

| | | |
|---|---|---|
| 10,617,054 B2 | 4/2020 | Gresch et al. |
| 10,676,141 B2 | 6/2020 | Schott et al. |
| 2018/0332760 A1* | 11/2018 | Gresch ................. A01B 63/111 |

FOREIGN PATENT DOCUMENTS

| | | | |
|---|---|---|---|
| DE | 102017208558 A1 | 11/2018 | |
| EP | 3384746 A1 * | 10/2018 | ........... A01B 63/145 |
| EP | 3403487 A1 | 11/2018 | |

* cited by examiner

METHOD FOR ASSISTING A COMPACTION-APPROPRIATE DISTRIBUTION OF HARVESTED MATERIAL IN A FLAT SILO

RELATED APPLICATIONS

This application claims priority to German Application No. 102020204927.0, filed Apr. 17, 2020, and German Application No. 102020206120.3, filed May 14, 2020, the disclosures of which are hereby expressly incorporated by reference in their entirety.

FIELD OF THE DISCLOSURE

The present disclosure relates to a method for assisting a compaction-appropriate distribution of harvested material in a flat silo.

BACKGROUND

Within the scope of livestock husbandry, in many agricultural enterprises the feeding of silage is customary. Silage consists of fermented harvested material—such as, for instance, mown grass, chopped-up corn plants or even various sorts of grain. For the purpose of fermentation, the harvested material to be ensiled is distributed in layers in a so-called bunker silo or flat silo by a silo vehicle, then compacted, and finally covered with respect to ingress of air from outside by a plastic tarpaulin. The flat silo is typically located in a trough enclosed by concrete walls. But it may also be a question of a soil silo. In order to achieve optimal fermentation results, in addition to the silo shape to be suitably chosen for the harvested material in question, a defined distribution and compaction are decisive. This presupposes appropriate specialized knowledge and experience on the part of the operator in the course of operating the silo vehicle.

In this context, it is also to be observed that some operators lower the distribution tool too far, and already compacted harvested material is pushed up again. This is the case, in particular, for the distribution of corn by a distribution tool taking the form of a distribution plate. The distribution-and-compaction process then becomes correspondingly inefficient, because already compacted harvested material exerts a higher resistance on the distribution tool than uncompacted harvested material. As a result, this leads to an increase in the demand for shear force, and hence in the fuel consumption of the silo vehicle. The treatment process is also delayed, since the loosened harvested material has to be distributed and compacted again.

For the purpose of assisting the operator, in DE 10 2017 208 558 A1 among other things a method is described for distributing, by a distribution tool during a distribution process, harvested material which has been made available. The distribution tool, which is movably mounted on an agricultural processing machine, is motion-controlled at least partly automatically in such a manner that the tool assumes a predetermined working height relative to a reference surface. In this connection, the presetting of the working height is undertaken in accordance with a residual harvested material still to be distributed during a distribution process and in accordance with a residual distance still remaining along a distribution distance for the distribution of the harvested material. By this means, an efficient and uniform distribution of the harvested material can be obtained.

Thus, there is a need to improve the fermentation result in the course of creating a flat silo.

SUMMARY

According to the present disclosure, a method for assisting a compaction-appropriate distribution of harvested material in a flat silo provides that a control unit carries the following:

a dry-substance density $D_{Mdry}$ to be achieved is ascertained as a function of first input variables that reflect material properties of the harvested material, a maximally producible compaction pressure $p_d$ is ascertained by evaluation of second input variables that reflect operating properties or operating specifications of a silo vehicle used for compaction, a maximally permissible layer thickness $d_{max}$ for the implementation of a distribution-and-compaction process is ascertained from the ascertained dry-substance density $D_{Mdry}$ to be achieved and from the ascertained maximally producible compaction pressure pa, a layer thickness $d_{akt}$ currently being applied during the implementation of the distribution-and-compaction process is ascertained in location-specific manner, a comparison between the ascertained maximally permissible layer thickness $d_{max}$ and the layer thickness $d_{akt}$ currently being applied, ascertained in location-specific manner, is carried out in order to ascertain a target layer thickness $d_{soll}$, optimized in location-specific manner of the harvested material for the implementation of the distribution-and-compaction process, and a regulating device of a distribution tool provided on the silo vehicle is driven in the sense of an assimilation of the layer thickness $d_{akt}$ currently being applied, ascertained in location-specific manner, to the ascertained layer thickness $d_{soll}$ optimized in location-specific manner.

For the purpose of implementing the distribution-and-compaction process, the operator has exclusively to control the travel of the silo vehicle by steering and also accelerating or braking. The placement of the distribution tool, on the other hand, is adapted in an automated manner, depending on the respective position of the silo vehicle. This represents a significant alleviation of work in comparison with the otherwise customary manual distribution and compaction of the harvested material in a flat silo, in the course of which comparatively stringent demands are made of the operator in terms of specialized knowledge and experience.

The method according to the invention is based, lastly, on a location-predictive or self-optimizing approach in which a layer thickness $d_{soll}$, optimized with regard to its compactability, for a subsequent (infinitesimally large) silo section is ascertained in each instance in advance from the layer thickness $d_{akt}$ currently being applied, the ascertained layer thickness then constituting the basis for driving the regulating device of the distribution tool.

As a result, a fermentation result that has been optimized with respect to the harvested material in question is ensured.

The distribution tool can take the form of a distribution plate arranged frontally on the silo vehicle, the distribution plate being modified by the regulating device with regard to a spacing d or a vertical attitude a with respect to the silo surface constituted by an outer layer of harvested material. The regulating device may be, in particular, a hydraulic three-point power lifter which is located in the front region of the silo vehicle taking the form of an agricultural tractor. The distribution plate has been detachably fitted to the three-point power lifter via associated coupling elements. For the purpose of modifying the vertical attitude a with respect to the silo surface, the distribution plate can be tilted by a hydraulic top link encompassed by the three-point power lifter. A hydraulic hoisting mechanism enables raising and lowering of the distribution plate and hence a modification of the spacing d with respect to the silo surface. Both the hydraulic hoisting mechanism and the hydraulic top link can be actuated for this purpose at the instigation of the control unit via associated electrical control valves which are linked with a hydraulic system of the agricultural tractor.

As an alternative to the use of a distribution plate, it is also conceivable that the distribution tool is a rotary distributor or a shovel or a rake blade on a front loader of the silo vehicle taking the form of an agricultural tractor. A scraping blade or another suitable distribution tool on a hydraulic three-point power lifter may also have been provided in the rear region of the agricultural tractor.

For the purpose of optimizing the target layer thickness $d_{soll}$ ascertained in location-specific manner, a working-efficiency preset or compaction-efficiency preset to be adhered to as secondary condition in the course of the implementation of the distribution-and-compaction process can be incorporated by the control unit. The choice of an increased working efficiency or compaction efficiency by corresponding enlargement of the target layer thickness $d_{soll}$ in this case comes at the expense of the compaction quality, and conversely. To this extent, an appropriate compromise has to be found by the operator.

It is conceivable that the working-efficiency preset or compaction-efficiency preset to be adhered to is capable of being selected in accordance with established categories via a user interface linked with the control unit. In this connection, categories that are capable of being readily estimated—such as "high", "medium" and "low"—are conceivable for the operator. The working-efficiency preset or compaction-efficiency preset can be set to "high" as standard.

Also possible is a so-called boost mode in which the target layer thickness $d_{soll}$, optimized in location-specific manner, is capable of selectively exceeding the ascertained maximally permissible layer thickness $d_{max}$ in the sense of a prioritization of highest possible working efficiency or compaction efficiency.

The user interface is, for instance, a mobile terminal of universal type (tablet computer, smartphone, etc.) which is capable of being fitted in a driver's cab of the silo vehicle and which exhibits a touch-screen and is linked in a wireless manner with the control unit via a Bluetooth interface or WLAN interface. The touch-screen constitutes, at the same time, an operating-and-display unit of the user interface. Alternatively, the user interface may also have been permanently built into the driver's cab by the manufacturer as a so-called graphical user interface (GUI).

Furthermore, there is the possibility that data with regard to a silo contour captured prior to implementation of the distribution-and-compaction process and with regard to a silo contour to be obtained upon applying the next layer of harvested material are incorporated by the control unit for the purpose of optimizing the target layer thickness $d_{soll}$ ascertained in location-specific manner. The silo contour to be obtained (that is to say, the optimal silo contour with respect to the fermentation process) is, among other things, dependent on the kind of the harvested material to be ensiled, in particular on the type of plant, and can be predetermined by the operator via the user interface linked with the control unit. In particular, besides the possibility of the input of a desired attitude or of outside dimensions of the flat silo for the type of plant in question, suitable silo shapes can be offered to the operator for selection. These silo shapes may differ with regard to, among other things, their lateral gradient, the ratios of the outside dimensions, and their curvature. The capture of the silo contour is undertaken on the basis of a continuous recording of a spatial position, ascertained from GPS data of the silo vehicle during the distribution-and-compaction process implemented previously. By comparison of the silo contour captured prior to implementation of the distribution-and-compaction process and of the silo contour to be obtained upon applying the next layer of harvested material, voids, in particular, can be identified and filled up selectively with harvested material. The target layer thickness $d_{soll}$ can also be varied in location-specific manner in order to realize an intentionally inhomogeneous distribution of the harvested material along the curvature of the flat silo.

In the course of the drive of the regulating device of the distribution tool it is conceivable that information is incorporated with regard to a total quantity to be distributed of harvested material discharged into the flat silo or with regard to a residual quantity of harvested material to be distributed. If the harvested material is transported to the flat silo by a loading wagon with feeder, the total quantity to be distributed can be derived, in particular, from the delivery volume and from the mass density of the harvested material brought into a loading space of the loading wagon via the feeder. On the assumption that the loading wagon is completely emptied into the flat silo, in this way a precise statement can be made with regard to the total quantity subsequently to be distributed. With respect to the ascertainment of the residual quantity of harvested material to be distributed, the control unit can evaluate an influence of force exerted on the distribution tool. In the latter case, geometrical properties of the distribution tool such as, for example, the width of an associated distribution plate and the shape thereof are taken into consideration. The extent of the influence of force exerted on the distribution tool can be estimated on the basis of the pressure conditions brought about in the hydraulic top link of the three-point power lifter, incorporating the vertical attitude a derived from the extension position thereof.

The distribution of the harvested material can be undertaken in such a manner in accordance with the quantity of harvested material discharged into the flat silo that a minimal layer thickness $d_{min}$ is not fallen short of. For if the discharged quantity of harvested material, measured against the available silo surface, is comparatively low, it is not sensible to distribute this quantity over the entire silo surface in time-consuming manner. A distribution then occurs merely along a smaller partial section.

In particular, the quantity of harvested material discharged from the loading wagon into the flat silo can be captured by a farm-management system and communicated in a wireless manner to the control unit. This is undertaken, for instance, via a mobile radio interface linked with the control unit.

The first input variables can relate to a residual-moisture content of the harvested material, to a type of plant or to a degree of processing. The variables in question are crucial for the dry-substance density $D_{Mdry}$ to be achieved and can be input by the operator of the silo vehicle prior to the start of the silo operations via the user interface linked with the control unit. In this connection, the degree of processing takes into consideration the factor of whether the complete plant or merely certain plant constituents are to be ensiled, and to what degree such plant constituents have been shredded where appropriate. The degree of shredding results, in general, from the length of cut in the course of harvesting the plants by a forage harvester or such like. The residual-moisture content of the harvested material can be ascertained by the operator by a conventional moisture meter prior to the start of the distribution-and-compaction process. In this connection, the use of a so-called Harvest-Lab sensor also presents itself, such as finds application for the analysis of harvested material in the case of forage harvesters produced by the manufacturer John Deere. The corresponding measured data can then be communicated to the farm-management system, and from there in wireless manner to the control unit. The communication can be updated in each instance for each load of harvested material to be newly distributed, so that a precise ascertainment of the dry-substance density $D_{Mdry}$ to be achieved is guaranteed.

Moreover, the second input variables may relate to a vehicle weight, a contact area formed by a ground-contact device of the silo vehicle, a tire pressure, a tire type, or compaction properties of a compaction tool provided on the silo vehicle. The vehicle weight, inclusive of possible ballasting weights, can be input by the operator, likewise prior to the start of the silo operations, via the user interface linked with the control unit. Furthermore, relevant information pertaining to a ballasting assistant such as is described in DE 10 2017 205 827 A1 can be utilized. By linkage with the known contact area of the ground-contact device, which are either wheels or chain running mechanisms, the associated normal force of the silo vehicle then results. If the ground-contact devices are wheels with associated tires, the normal force is, in addition, influenced by the tire pressure and also by the tire type, i.e., more precisely, by specifications with regard to deformability and profiling. In addition, for the purpose of compacting the harvested material a special compaction tool may be present in addition to the ground-contact device. The compaction tool is typically constituted by a silo roller which has been fitted to the silo vehicle at the rear. The compaction properties of the silo roller have been specified by the manufacturer, so an influence on the maximally producible compaction pressure $p_d$ to be achieved can be readily estimated.

The manner of proceeding in connection with the ascertainment of the layer thickness $d_{akt}$ currently being applied depends on the kind of the harvested material to be ensiled.

If stem-type harvested material such as, for instance, grass or such like is to be ensiled, the layer thickness $d_{akt}$ currently being applied can be ascertained by the control unit on the basis of a comparison between a first silo contour captured prior to implementation of the distribution-and-compaction process and a second silo contour resulting upon implementation of the distribution-and-compaction process. The layer thickness $d_{akt}$ currently being applied then results directly on the basis of the local spacing of the two silo contours from one another. The first and second silo contours can be captured in each instance by continuous recording of a (spatial) position, ascertained from GPS data, of the silo vehicle in the course of creating the flat silo.

If the harvested material is pourable material in the form of grain or such like, the layer thickness $d_{akt}$ currently being applied can be ascertained by the control unit on the basis of a comparison between a silo contour captured prior to implementation of the distribution-and-compaction process and a positioning, captured with respect to the silo contour, of the distribution tool. For the case where the distribution tool takes the form of a distribution plate, the layer thickness $d_{akt}$ currently being applied then results directly from the local spacing d of the lower plate edge with respect to the captured silo contour. Here too, the capture of the silo contour can be undertaken by continuous recording of the (spatial) position, ascertained from GPS data, of the silo vehicle in the course of creating the flat silo.

For the purpose of informing the operator comprehensively about the status of the silo operations or, to be more precise, about the corresponding compaction status of the flat silo, there is the possibility that the layer thickness $d_{akt}$ currently being applied, ascertained in location-specific manner, the ascertained maximally permissible layer thickness $d_{max}$ or the ascertained layer thickness $d_{soll}$, optimized in location-specific manner are visualized via a display unit linked with the control unit. At least the layer thickness $d_{akt}$ currently being applied and also the optimized layer thickness $d_{soll}$ are dependent on the respective location on the flat silo so the visualization thereof in the form of a cartographic silo view presents itself. The display unit may be an integral part of the user interface already mentioned.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
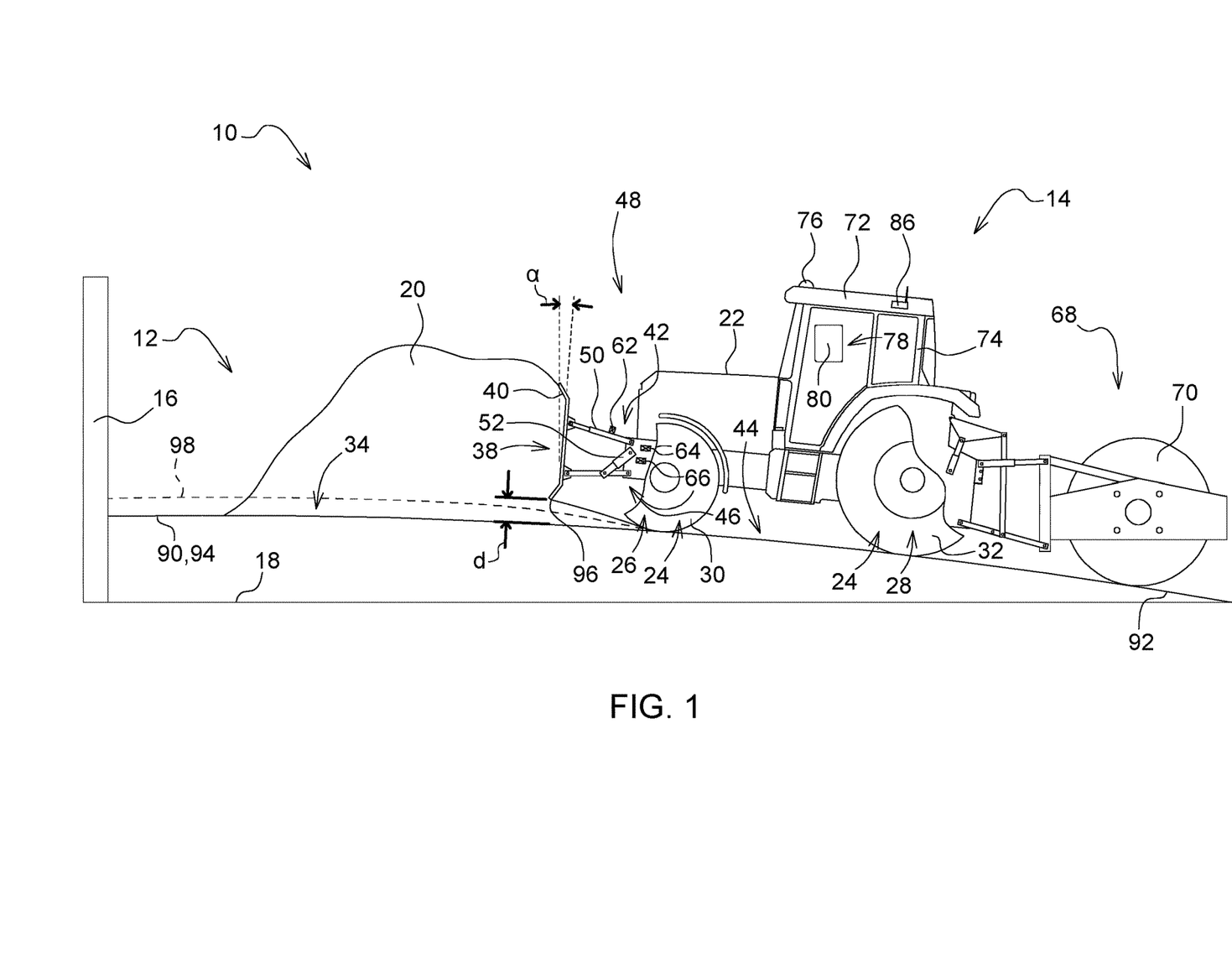
FIG. 1 is a schematic view of a working environment in which a method of the present disclosure is executed.
Figure 2:
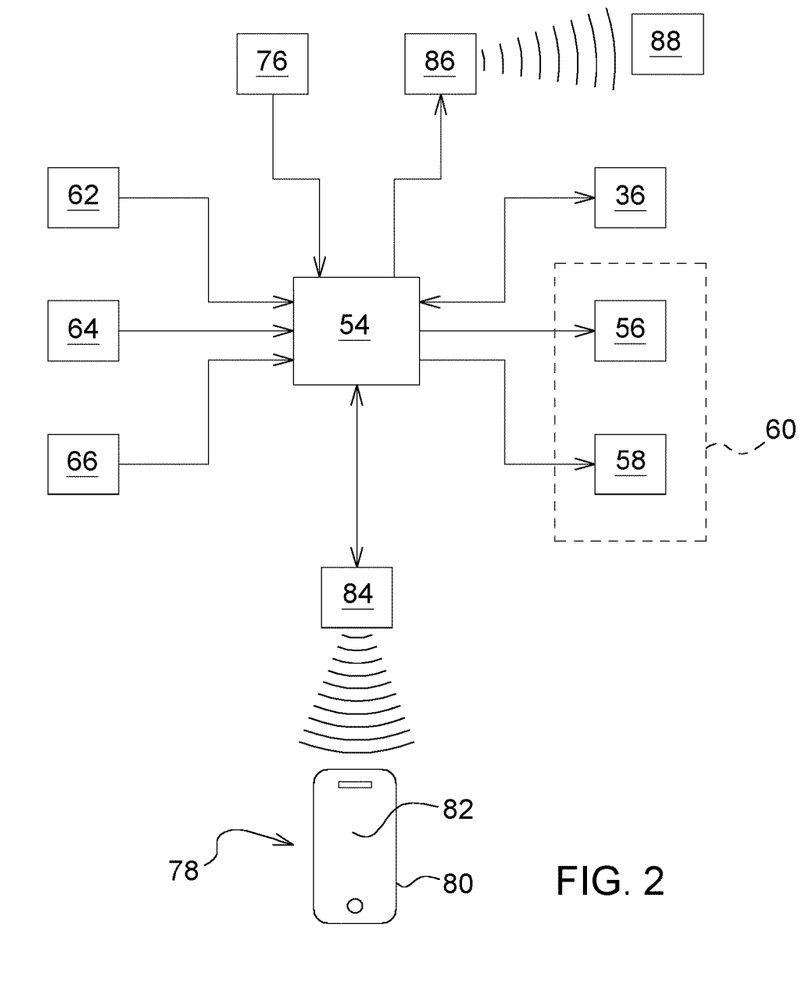
FIG. 2 is a separate representation of hardware components for executing the method according to the present disclosure.

FIG. 1 shows a schematic view of a working environment 10 in which the method according to the present disclosure is executed, where some hardware components having been reproduced separately in FIG. 2 for reasons of clarity. Represented in FIG. 1 are a flat silo 12 and a silo vehicle 14 provided for the purpose of creating the flat silo 12.

The flat silo 12 is located in a vat 18 enclosed by concrete walls 16. For the purpose of fermentation, the harvested material 20 to be ensiled such as, for instance, mown grass, chopped-up corn plants or even various sorts of grain is distributed in layers in the flat silo 12 by the silo vehicle 14, then compacted, and finally covered with respect to ingress of air from outside by a plastic tarpaulin which is not shown.

The silo vehicle 14 provided for implementing the distribution-and-compaction process is an agricultural tractor 22 which is supported with respect to the subsurface 34 via a ground-contact device 24 which in the present case take the form of front and rear wheels 26, 28 with associated tires 30, 32. The tires 30, 32 can be pressurized with a desired tire pressure by a central tire-inflating system 36.

The agricultural tractor 22 carries a distribution tool 38 which takes the form of a frontally arranged distribution plate 40. The distribution plate 40 is capable of being modified by a regulating device 42 with regard to a spacing d or a vertical attitude a with respect to the silo surface 44 constituted by an outer layer of harvested material (pertaining to the distribution-and-compaction process implemented previously). The regulating device 42 is a hydraulic three-point power lifter 46 which is located in the front region 48 of the agricultural tractor 22. The distribution plate 40 has been detachably fitted to the three-point power lifter 46 via associated coupling elements.

For the purpose of modifying the vertical attitude a with respect to the silo surface 44, the distribution plate 40 can be tilted by a hydraulic top link 50 encompassed by the three-point power lifter 46. A hydraulic hoisting mechanism 52 enables raising and lowering of the distribution plate 40 and hence a modification of the spacing d with respect to the silo surface 44. Both the hydraulic hoisting mechanism 52 and the hydraulic top link 50 can be actuated for this purpose at the instigation of a microprocessor-controlled control unit 54 via associated electrical control valves 56, 58 which are linked with a hydraulic system 60 of the agricultural tractor 22. The pressure conditions prevailing in the hydraulic top link 50 are captured by a pressure sensor 62 and communicated to the control unit 54 together with an extension position, captured by a first regulating-distance sensor 64, of the hydraulic top link 50. A second regulating-distance sensor 66 serves for capturing the positioning of the hydraulic hoisting mechanism 52 and hence of the distribution tool 38 with respect to the silo surface 44.

For the purpose of compacting the harvested material 20, a special compaction tool 68 is present in addition to the ground-contact device 24. The compaction tool is constituted in FIG. 1 by a silo roller 70. The silo roller 70 has been fitted to the agricultural tractor 22 at the rear.

A GPS receiver 76 fitted in the roof region 72 of a driver's cab 74 serves for determining the spatial position of the agricultural tractor 22 with respect to the flat silo 12. The position determined by the GPS receiver 76 is additionally corrected by utilization of an RTK method (where RTK stands for real-time kinematic), so a precision in the region of ±1 cm is achieved. The GPS data corrected in such a way are subsequently supplied to the control unit 54.

Moreover, a user interface 78 has been provided which, by way of example, is a mobile terminal 80 of universal type (tablet computer, smartphone, etc.) which is capable of being fitted in the driver's cab 74 of the agricultural tractor 22 and which exhibits a touch-screen 82 and is linked in wireless manner with the control unit 54 via a Bluetooth interface or WLAN interface 84. The touch-screen 82 constitutes, at the same time, an operating-and-display unit of the user interface 78. Alternatively, the user interface 78 has been permanently built into the driver's cab 74 by the manufacturer as a so-called graphical user interface (GUI).

A mobile radio interface 86 linked with the control unit 54 enables a wireless exchange of data with a farm-management system 88. A farm-management system 88 of such a type is known, for instance, as "John Deere Operations Center" which, in particular, enables an access to MyJohnDeere.com via the mobile terminal 80 for the purpose of central work planning and monitoring.

Figure 3:
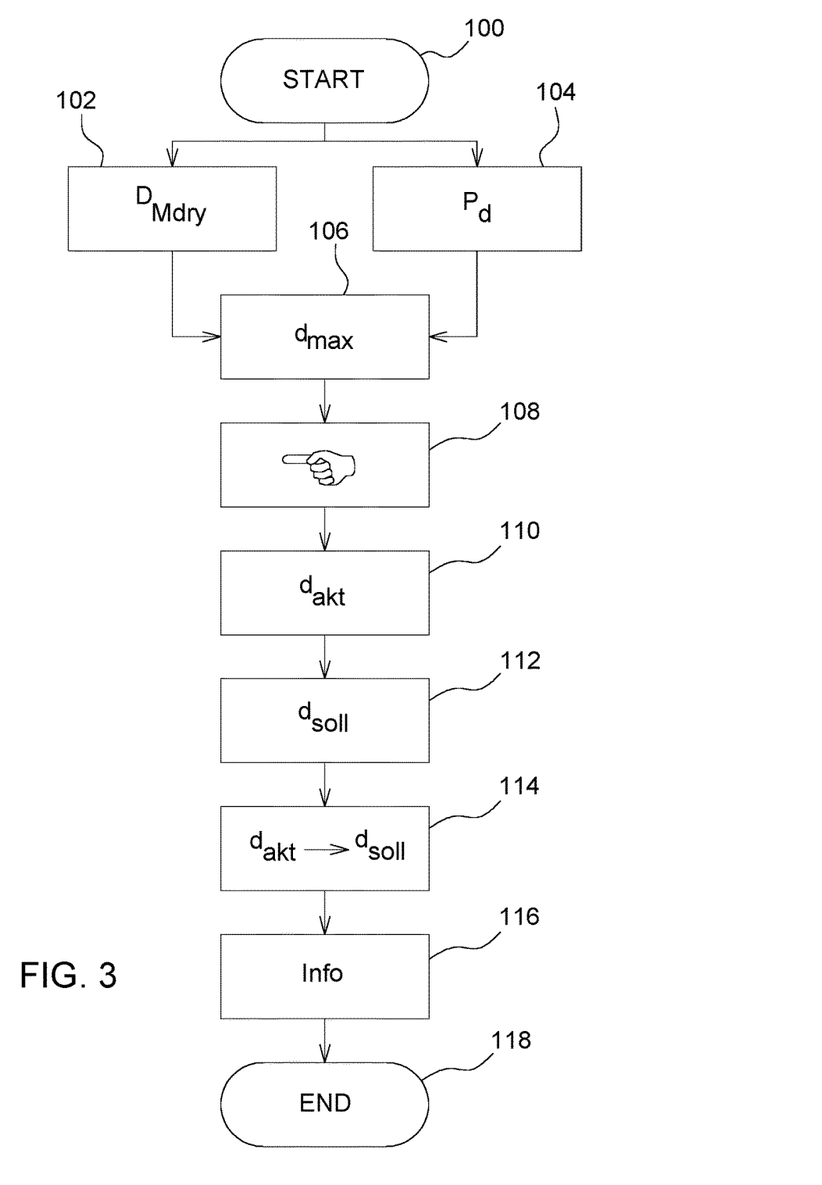
FIG. 3 is a flowchart of an embodiment of the method according to the present disclosure.

FIG. 3 shows an embodiment, represented as a flowchart, of the method according to the present disclosure which is to be elucidated with reference to the working environment 10 represented in FIG. 1.

The method, executed as appropriate software by the control unit 54, is initiated in a starting step 100.

In a first step 102, a dry-substance density $D_{Mdry}$ to be achieved is ascertained by the control unit 54 as a function of first input variables that reflect material properties of the harvested material 20. The first input variables relate to a residual-moisture content of the harvested material 20 to a type of plant or to a degree of processing. The variables in question are crucial for the dry-substance density $D_{Mdry}$ to be achieved and are input via the touch-screen 82 by the operator of the agricultural tractor 22 prior to the start of the silo operations. In this connection, the degree of processing takes into consideration the factor of whether the complete plant or merely certain plant constituents are to be ensiled, and to what degree such plant constituents have been shredded where appropriate. The degree of shredding results, in general, from the length of cut in the course of harvesting the plants by a forage harvester or such like. The residual-moisture content of the harvested material 20 is ascertained by the operator by a conventional moisture meter prior to the start of the distribution-and-compaction process. Alternatively, a so-called HarvestLab sensor is used such as finds application for the analysis of harvested material in the case of forage harvesters produced by the manufacturer John Deere. The corresponding measured data are then communicated to the farm-management system 88, and from there in wireless manner to the control unit 54. The communication is updated in each instance for each load of harvested material to be newly distributed, so that a precise ascertainment of the dry-substance density $D_{Mdry}$ to be achieved is guaranteed.

Moreover, a maximally producible compaction pressure $p_d$ is ascertained by the control unit 54 in a second step 104 by evaluation of second input variables that reflect operating properties or operating specifications of the agricultural tractor 22 used for compaction. The second input variables relate to a vehicle weight, a contact area formed by the ground-contact device 24 of the agricultural tractor 22, a tire pressure, a tire type or to compaction properties of the silo roller 70 provided on the agricultural tractor 22. The vehicle weight, inclusive of possible ballasting weights, is input by the operator via the touch-screen 82, likewise prior to the start of the silo operations. Furthermore, relevant information pertaining to a ballasting assistant such as is described in DE 10 2017 205 827 A1 can be utilized. By linkage with the known contact area of the tires 30, 32, the associated normal force of the agricultural tractor 22 then results. The normal force is influenced by the tire pressure and also by the tire type, more precisely, by specifications with regard to deformability and profiling. The compaction properties of the silo roller 70 have been specified by the manufacturer so an influence on the maximally producible compaction pressure $p_d$ to be ascertained can be readily estimated. In this connection the corresponding specifications relating to tire type and silo roller 70 can be selected by the operator in menu-driven manner via the touch-screen 82. The respective tire pressure is determined by the central tire-inflating system 36 and communicated to the control unit 54.

In a following third step 106, a maximally permissible layer thickness $d_{max}$ for the implementation of a distribution-and-compaction process is ascertained by the control unit 54 from the dry-substance density $D_{Mdry}$ to be achieved, ascertained in the first step 102, and from the maximally producible compaction pressure $p_d$ ascertained in the second step 104.

Subsequently, in a fourth step 108 the operator is prompted via the touch-screen 82 to start the distribution-and-compaction process. As soon as this has happened, in a fifth step 110 a layer thickness $d_{akt}$ currently being applied during the implementation of the distribution-and-compaction process is ascertained in location-specific manner by the control unit 54.

The manner of proceeding in connection with the ascertainment of the layer thickness $d_{akt}$ currently being applied depends on the kind of the harvested material 20 to be ensiled.

If stem-type harvested material 20 such as, for instance, grass or such like is to be ensiled, the layer thickness $d_{akt}$ currently being applied is ascertained by the control unit 54 on the basis of a comparison between a first silo contour 90 captured prior to implementation of the distribution-and-compaction process and a second silo contour 92 resulting upon implementation of the distribution-and-compaction process. The layer thickness $d_{akt}$ currently being applied then results directly on the basis of the local spacing of the two silo contours 90, 92 from one another. In this connection, the first and second silo contours 90, 92 are captured in each instance by continuous recording of the (spatial) position of the agricultural tractor 22, ascertained from the corrected GPS data, in the course of creating the flat silo 12.

If the harvested material 20 is pourable material in the form of grain or such like, the layer thickness $d_{akt}$ currently being applied is ascertained by the control unit 54 on the basis of a comparison between a silo contour 94 captured prior to implementation of the distribution-and-compaction process and a positioning, captured with respect to the silo contour by the second regulating-distance sensor 66 of the distribution tool 38. For the case where the distribution tool 38 takes the form of a distribution plate 40, the layer thickness $d_{akt}$ currently being applied then results directly from the local spacing d of the lower plate edge 96 with respect to the captured silo contour 94. Here too, the capture of the silo contour 94 is undertaken by continuous recording of the (spatial) position, ascertained from the corrected GPS data, of the agricultural tractor 22 in the course of creating the flat silo 12.

The fifth step 110 is followed by a sixth step 112, in which a comparison between the ascertained maximally permissible layer thickness $d_{max}$ and the layer thickness $d_{akt}$ currently being applied, ascertained in location-specific manner, is carried out by the control unit 54 in order to ascertain a target layer thickness $d_{soll}$ optimized in location-specific manner of the harvested material 20 for the implementation of the distribution-and-compaction process.

Furthermore, in the sixth step 112 for the purpose of optimizing the target layer thickness $d_{soll}$ ascertained in location-specific manner, the control unit 54 incorporates data with regard to the silo contour 90 or 94 captured prior to implementation of the distribution-and-compaction process and with regard to a silo contour 98 to be obtained upon applying the next layer of harvested material. In this connection, the silo contour 98 to be obtained (that is to say, the optimal contour with respect to the fermentation process) is, among other things, dependent on the kind of the harvested material 20 to be ensiled, in particular on the type of plant, and is predetermined by the operator via the touch-screen 82. For this purpose, besides the possibility of the input of a desired attitude or of outside dimensions of the flat silo 12 for the type of plant in question, suitable silo shapes are offered to the operator for selection. These shapes differ with regard to, among other things, their lateral gradient, the ratios of the outside dimensions and their curvature. By comparison of the silo contour 90 or 94 captured prior to implementation of the distribution-and-compaction process and of a silo contour 98 to be obtained upon applying the next layer of harvested material, voids, in particular, can be identified and filled up selectively with harvested material 20. Optionally, the target layer thickness $d_{soll}$ is varied in location-specific manner in order to realize an intentionally inhomogeneous distribution of the harvested material 20 along the curvature of the flat silo 12.

In a seventh step 114, the regulating device 42 of the distribution tool 38 provided on the agricultural tractor 22 is driven by the control unit 54 in the sense of an assimilation of the layer thickness $d_{akt}$ currently being applied, ascertained in a location-specific manner, to the ascertained layer thickness $d_{soll}$ optimized in location-specific manner.

For the purpose of informing the operator comprehensively about the status of the silo operations or, to be more precise, about the corresponding compaction status of the flat silo 12, in an eighth step 116 the layer thickness $d_{akt}$ currently being applied, ascertained in a location-specific manner, the ascertained maximally permissible layer thickness $d_{max}$ or the ascertained layer thickness $d_{soll}$, optimized in a location-specific manner, are visualized via the touch-screen 82. At least the layer thickness $d_{akt}$ currently being applied and also the optimized layer thickness $d_{soll}$ are dependent on the respective location on the flat silo 12 so the visualization thereof is undertaken in the form of a cartographic silo view.

Subsequently, the method according to the present disclosure is concluded in a final step 118.

As a result, for the purpose of implementing the distribution-and-compaction process the operator has exclusively to control the travel of the agricultural tractor 22 by steering and also accelerating or braking. The placement of the distribution tool 38, on the other hand, is adapted in an automated manner depending on the respective position of the agricultural tractor 22.

The method according to the present disclosure may feature various further developments which have optionally been provided, corresponding to respective expansion stages.

According to a first option, for the purpose of optimizing the target layer thickness $d_{soll}$, ascertained in a location-specific manner, a working-efficiency preset or compaction-efficiency preset to be adhered to as secondary condition in the course of the implementation of the distribution-and-compaction process is incorporated by the control unit 54 in the sixth step 112. The choice of an increased working efficiency or compaction efficiency by corresponding enlargement of the target layer thickness $d_{soll}$ in this case comes at the expense of the compaction quality, and conversely. To this extent, an appropriate compromise has to be found by the operator.

The working-efficiency preset or compaction-efficiency preset to be adhered to is capable of being predetermined via the touch-screen 82 in accordance with established categories. In this connection, categories that are capable of being readily estimated such as "high", "medium" and "low" have been provided for the operator. The working-efficiency preset or compaction-efficiency preset has been set to "high" as standard.

Additionally, via the touch-screen 82 a so-called boost mode is capable of being selected in which the target layer thickness $d_{soll}$, optimized in a location-specific manner, is capable of selectively exceeding the ascertained maximally permissible layer thickness $d_{max}$ in the sense of a prioritization of highest possible working efficiency or compaction efficiency.

In addition, by way of a second option, there may be a provision that information with regard to a total quantity, to be distributed, of harvested material 20 discharged into the flat silo 12 or with regard to a residual quantity of harvested material 20 to be distributed is incorporated in the seventh step 114 in the course of the drive of the regulating device 42 of the distribution tool 38. If the harvested material 20 is transported to the flat silo 12 by a loading wagon with a feeder, the total quantity to be distributed is derived from the delivery volume and from the mass density of the harvested material 20 brought into a loading space of the loading wagon via the feeder. On the assumption that the loading wagon is completely emptied into the flat silo 12, in this way a precise statement can be made with regard to the total quantity subsequently to be distributed. The quantity of harvested material discharged from the loading wagon into the flat silo 12 is captured by the farm-management system 88 and communicated in a wireless manner to the control unit 54. This is undertaken via the mobile radio interface 86 linked with the control unit 54.

With respect to the ascertainment of the residual quantity of harvested material 20 to be distributed, the control unit 54 evaluates an influence of force exerted on the distribution tool 38. In the latter case, geometrical properties of the distribution tool 38 such as the width of the associated distribution plate 40 and the shape thereof are taken into consideration. The extent of the influence of force exerted on the distribution tool 38 is estimated by the control unit 54 on the basis of the pressure conditions brought about in the hydraulic top link 50 of the three-point power lifter 46 and is also captured by the pressure sensor 62, incorporating the vertical attitude a derived from the extension position of the hydraulic top link 50 captured by the first regulating-distance sensor 64.

The distribution of the harvested material 20 is undertaken in such a manner in accordance with the quantity of harvested material discharged into the flat silo 12 that a minimal layer thickness $d_{min}$ is not fallen short of. For if the discharged quantity of harvested material, measured against the available silo surface 44, is comparatively low, it is not sensible to distribute this quantity over the entire silo surface 44 in a time-consuming manner. A distribution is then undertaken merely along a smaller partial section.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for assisting a compaction-appropriate distribution of harvested material in a flat silo, comprising:
   providing a silo vehicle having a control unit;
   ascertaining a dry-substance density to be achieved via the control unit as a function of first input variables that reflect material properties of the harvested material;
   determining a maximally producible compaction pressure via the control unit by evaluation of second input variables that reflect operating properties or operating specifications of the silo vehicle used for compaction;
   ascertaining a maximally permissible layer thickness of harvested material via the control unit for an implementation of a distribution-and-compaction process from the dry-substance density and the maximally producible compaction pressure;
   determining a layer thickness of harvested material currently being applied during the implementation of the distribution-and-compaction process in a location-specific manner via a GPS receiver;
   comparing the maximally permissible layer thickness and the layer thickness currently being applied in the location-specific manner via the control unit in order to ascertain a target layer thickness of harvested material optimized in the location-specific manner of the harvested material for the implementation of the distribution-and-compaction process; and
   driving a regulating device of a distribution tool provided on the silo vehicle to assimilate the layer thickness currently being applied to the target layer thickness via the control unit in an automated manner.

2. The method as claimed in claim 1, further comprising providing the distribution tool as a distribution plate arranged on a front end of the silo vehicle.

3. The method as claim in claim 2, further comprising modifying the distribution plate by the regulating device with regard to a spacing or a vertical attitude with respect to a surface of an outer layer of harvested material.

4. The method as claimed in claim 1, further comprising incorporating a working-efficiency preset to be adhered to as a secondary condition in the course of the implementation of the distribution-and-compaction process by the control unit.

5. The method as claimed in claim 4, further comprising selecting the working-efficiency preset in accordance with established categories via a user interface linked with the control unit.

6. The method as claimed in claim 1, further comprising incorporating via the control unit data with regard to a silo contour captured prior to implementation of the distribution-and-compaction process and with regard to a silo contour to be obtained upon applying the next layer of harvested material for optimizing the target layer thickness.

7. The method as claimed in claim 1, further comprising incorporating information with regard to a total quantity to be distributed of harvested material discharged into a flat silo or with regard to a residual quantity of harvested material to be distributed in the course of a drive of the distribution tool.

8. The method as claimed in claim 7, further comprising distributing harvested material into the flat silo so that a minimal layer thickness is not fallen short of.

9. The method as claimed in claim 7, further comprising:
   capturing the quantity of harvested material discharged from a loading wagon into the flat silo by a farm-management system; and
   communicating the quantity of harvested material wirelessly to the control unit.

10. The method as claimed in claim 1, wherein the first input variables relate to a residual-moisture content of the harvested material, a type of plant or a degree of processing.

11. The method as claimed in claim 1, wherein the second input variables relate to a vehicle weight, a contact area formed by a ground-contact device of a silo vehicle, a tire pressure, a tire type or compaction properties of a compaction tool provided on the silo vehicle.

12. The method as claimed in claim 1, further comprising determining the layer thickness by the control unit as a comparison between a first silo contour captured prior to implementation of the distribution-and-compaction process and a second silo contour resulting upon implementation of the distribution-and-compaction process.

13. The method as claimed in claim 1, further comprising determining the layer thickness by the control unit as a comparison between a silo contour captured prior to implementation of the distribution-and-compaction process and a positioning captured with respect to the silo contour of the distribution tool.

14. The method as claimed in claim 1, further comprising displaying the layer thickness currently being applied, the maximally permissible layer thickness, or the layer thickness optimized in the location-specific manner on a display unit which is in communication with the control unit.

15. A method for assisting a compaction-appropriate distribution of harvested material in a flat silo, comprising:
   providing a silo vehicle having a control unit and a regulating device of a distribution tool, the distribution tool comprising a distribution plate arranged on a front end of the silo vehicle;
   ascertaining a dry-substance density to be achieved via the control unit as a function of first input variables that reflect material properties of the harvested material;
   determining a maximally producible compaction pressure via the control unit by evaluation of second input variables that reflect operating properties or operating specifications of the silo vehicle used for compaction;
   ascertaining a maximally permissible layer thickness of harvested material via the control unit for an implementation of a distribution-and-compaction process from the dry-substance density and the maximally producible compaction pressure;
   determining a layer thickness of harvested material currently being applied during the implementation of the distribution-and-compaction process in a location-specific manner via a GPS receiver;
   comparing the maximally permissible layer thickness and the layer thickness currently being applied in the location-specific manner via the control unit in order to ascertain a target layer thickness of harvested material optimized in the location-specific manner of the harvested material for the implementation of the distribution-and-compaction process;
   incorporating a working-efficiency preset to be adhered to as a secondary condition in the course of the implementation of the distribution-and-compaction process by the control unit; and
   driving the regulating device to assimilate the layer thickness currently being applied to the target layer thickness via the control unit in an automated manner.

16. The method as claimed in claim 15, further comprising selecting the working-efficiency preset in accordance with established categories via a user interface linked with the control unit.

17. The method as claimed in claim 15, further comprising incorporating via the control unit a data with regard to a silo contour captured prior to implementation of the distribution-and-compaction process and with regard to a silo contour to be obtained upon applying the next layer of harvested material for optimizing the target layer thickness.

18. The method as claimed in claim 15, further comprising incorporating information with regard to a total quantity to be distributed of harvested material discharged into a flat silo or with regard to a residual quantity of harvested material to be distributed in the course of a drive of a distribution tool.

19. A method for assisting a compaction-appropriate distribution of harvested material in a flat silo, comprising:
   providing a silo vehicle having a control unit and a regulating device of a distribution tool, the distribution tool comprising a distribution plate arranged on a front end of the silo vehicle;
   ascertaining a dry-substance density to be achieved via the control unit as a function of first input variables that reflect material properties of the harvested material, wherein the first input variables relate to a residual-moisture content of the harvested material, a type of plant or a degree of processing;
   determining a maximally producible compaction pressure via the control unit by evaluation of second input variables that reflect operating properties or operating specifications of the silo vehicle used for compaction, wherein the second input variables relate to a vehicle weight, a contact area formed by a ground-contact device of a silo vehicle, a tire pressure, a tire type or compaction properties of a compaction tool provided on the silo vehicle;
   ascertaining a maximally permissible layer thickness of harvested material via the control unit for an implementation of a distribution-and-compaction process from the dry-substance density and the maximally producible compaction pressure;
   determining a layer thickness of harvested material currently being applied during the implementation of the distribution-and-compaction process in a location-specific manner via a GPS receiver;
   comparing the maximally permissible layer thickness and the layer thickness currently being applied in the location-specific manner via the control unit in order to ascertain a target layer thickness of harvested material optimized in the location-specific manner of the harvested material for the implementation of the distribution-and-compaction process;
   incorporating a working-efficiency preset to be adhered to as a secondary condition in the course of the implementation of the distribution-and-compaction process by the control unit; and
   driving the regulating device to assimilate the layer thickness currently being applied to the target layer thickness via the control unit in an automated manner.

20. The method as claimed in claim 19, further comprising determining the layer thickness by the control unit as a comparison between a silo contour captured prior to implementation of the distribution-and-compaction process and a positioning captured with respect to the silo contour of the distribution tool.

\* \* \* \* \*